United States Patent
Ooi et al.

(10) Patent No.: US 8,958,695 B2
(45) Date of Patent: Feb. 17, 2015

(54) OPTICAL ADDING AND DROPPING DEVICE AND OPTICAL TRANSMISSION APPARATUS

(75) Inventors: Hiroki Ooi, Kawasaki (JP); Takafumi Terahara, Kawasaki (JP); Kentaro Nakamura, Kawasaki (JP); Chihiro Ohshima, Kawasaki (JP); Tsuyoshi Yamamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 986 days.

(21) Appl. No.: 12/338,123

(22) Filed: Dec. 18, 2008

(65) Prior Publication Data

US 2009/0220242 A1    Sep. 3, 2009

(30) Foreign Application Priority Data

Feb. 29, 2008 (JP) ................. 2008-050867

(51) Int. Cl.
*H04J 14/02* (2006.01)

(52) U.S. Cl.
CPC ......... *H04J 14/0213* (2013.01); *H04J 14/0208* (2013.01); *H04J 14/0212* (2013.01)
USPC .................. 398/83; 398/85; 398/52

(58) Field of Classification Search
CPC . H04J 14/0201; H04J 14/021; H04J 14/0213; H04J 14/02; H04J 14/00; H04J 14/002; H04J 14/0212; H04J 14/0208
USPC .................. 398/83, 85, 87, 84, 82, 79, 95, 43
See application file for complete search history.

(56) References Cited

U.S. PATENT DOCUMENTS

| 7,024,116 B2 * | 4/2006 | Orbach et al. .................. 398/83 |
| 7,425,696 B2 * | 9/2008 | Kawanishi et al. ...... 250/227.23 |
| 2002/0131111 A1 * | 9/2002 | Hait .............................. 359/124 |
| 2003/0030890 A1 * | 2/2003 | Tanaka et al. ................. 359/334 |
| 2003/0103771 A1 * | 6/2003 | Atmur et al. .................. 398/152 |
| 2004/0208428 A1 | 10/2004 | Kikuchi et al. |

FOREIGN PATENT DOCUMENTS

| JP | 4-185132 | 7/1992 |
| JP | 2002-116341 | 4/2002 |
| JP | 2003-244102 | 8/2003 |
| JP | 2006-87062 | 3/2006 |

OTHER PUBLICATIONS

Japanese Patent Office Notification of Reasons for Refusal mailed Feb. 28, 2012 for corresponding Japanese Patent Application No. 2008-050867.

* cited by examiner

Primary Examiner — M. R. Sedighian
(74) Attorney, Agent, or Firm — Staas & Halsey LLP

(57) ABSTRACT

An optical adding and dropping device includes a drop section including an input port and having a through port and a plurality of drop ports set as output ports, a first multiplexer adapted to multiplex light from the through port and light from a plurality of add ports, and a spectrum foot removing section provided on the input side of the first multiplexer and adapted to remove a foot of a spectrum of light to be inputted from the add ports to the first multiplexer. The optical adding and dropping device can be configured at a low cost while it has adding and dropping functions.

17 Claims, 20 Drawing Sheets

OPTICAL ADDING AND DROPPING DEVICE AND OPTICAL TRANSMISSION APPARATUS

CROSS-REFERENCE TO RELATED APPLICATION(S)

This application is based upon and claims the benefit of priority of the prior Japanese Application No. 2008-050867, filed on Feb. 29, 2008 in Japan, the entire contents of which are hereby incorporated by reference.

FIELD

This application relates to an optical adding and dropping device and an optical transmission apparatus suitable for use with an optical communication system.

BACKGROUND

In recent years, it is demanded to increase functions of a node for constructing a photonic network, and not only a function for point-to-point transmission but also functions for freely switching a path of an optical signal such as an optical add/drop multiplexing (OADM) function and a wavelength cross-connect (WXC or optical hub) function are demanded.

Particularly in the optical add/drop multiplexing function, Colorless Mini OADM (hereinafter referred to simply as colorless OADM) is demanded. The colorless OADM has a function of making it possible to add (that is, insert) and drop (that is, branch) an optical signal of an arbitrary wavelength from each port although the number of Add and Drop ports is as small as, for example, eight and is smaller than the number of wavelengths to be multiplexed, and it is expected that the colorless OADM contributes to improvement of the network (wavelength routing), enhancement of the flexibility of apparatus arrangement (reduction in space by reduction of mounting slots) and reduction in cost.

It is to be noted that the following document discloses a known prior art relating to the invention of the present application:

[Patent Document 1] Japanese Patent Laid-Open No. 2006-87062

In the colorless OADM, in order to achieve reduction in cost, different from an ROADM (reconfigurable practical add/drop multiplexer), a function of adding and dropping wavelength multiplexed signals for all channels is not demanded, and it is necessary to suppress the number of wavelength selection switches of a high cost. On the other hand, in order to attain a transmission over a plurality of spans with favorable quality, it is also demanded to efficiently suppress the crosstalk between adjacent channels.

SUMMARY (1) In order to achieve the objects described above, according to an aspect of the present invention, there is provided an optical adding and dropping device comprising a drop section including an input port and having a through port and a plurality of drop ports set as output ports, a first multiplexer adapted to multiplex light from the through port and light from a plurality of add ports, and a spectrum foot removing section provided on the input side of the first multiplexer and adapted to remove a foot of a spectrum of light to be inputted from the add ports to the first multiplexer.

(2) According to another aspect of the present invention, there is provided an optical transmission apparatus comprising the optical adding and dropping device described in (1) above.

(3) According to a further aspect of the present invention, there is provided an optical transmission apparatus comprising an optical adding and dropping device including a drop section including an input port and having a through port and a plurality of drop ports set as output ports, and a first multiplexer adapted to multiplex light from the through port and light from a plurality of add ports, and an optical transmission section including a light source, and a spectrum foot removing section adapted to remove a foot of a spectrum of light from the light source and output the resulting light for transmission through the add ports.

Additional objects and advantages of the embodiment(s) will be set forth in part in the description which follows, and in part will be obvious from the description, or may be learned by practice of the embodiment(s). The object and advantages of the invention will be realized and attained by means of the elements and combinations particularly pointed out in the appended claims.

It is to be understood that both the foregoing general description and the following detailed description are exemplary and explanatory and are not restrictive of the embodiment, as claimed.

DESCRIPTION OF THE EMBODIMENTS

In the following, preferred embodiments are described with reference to the accompanying drawings.

[a] First Embodiment

Figure 1:
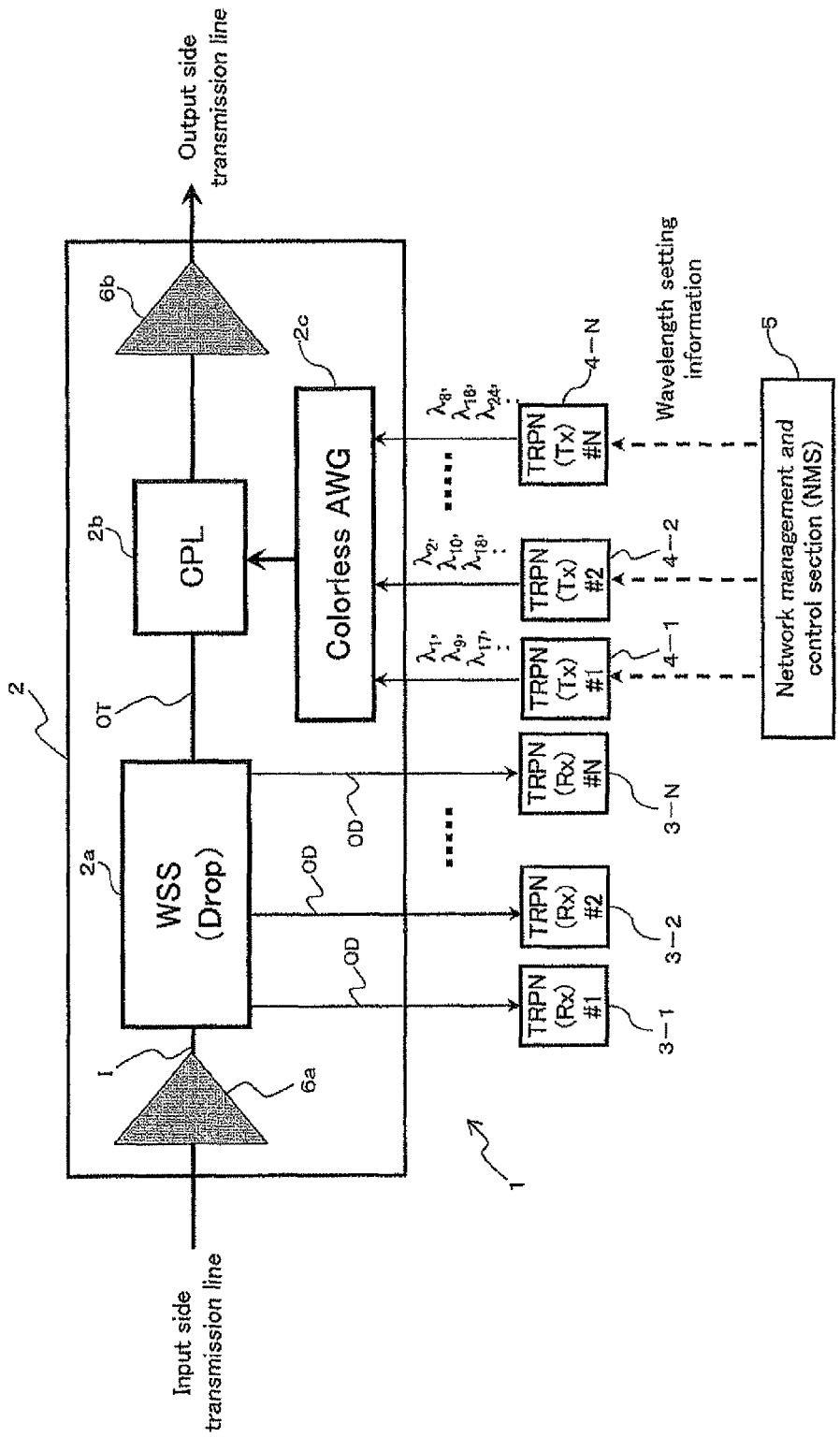
FIG. 1 is a block diagram showing an optical transmission apparatus according to a first embodiment.

FIG. 1 illustrates an optical transmission apparatus according to a first embodiment of the present invention. Referring to FIG. 1, the optical transmission apparatus 1 shown is provided in an optical network which transmits wavelength division multiplexed (WDM) optical signals. The optical transmission apparatus 1 includes an optical add/drop section 2 and transponders (TRPN) 3-1 to 3-N and 4-1 to 4-N.

The transponders 3-1 to 3-N are optical reception sections which individually receive optical signals in a unit of a channel dropped by the optical add/drop section 2. Meanwhile, the transponders 4-1 to 4-N are optical transmission sections which output (transmit) light to be added by the optical add/drop section 2. It is to be noted that the transponders 4-1 to 4-N are set so as to vary the output optical wavelength under the control of a network management and control section (NMS) 5.

It is to be noted that the installation number (N) of the transponders 3-1 to 3-N and the transponders 4-1 to 4-N provided as light reception sections corresponds to the number of channels which can be dropped (branched) and added (inserted) by the optical add/drop section 2. For example, the number N may be set to N=8 such that the number of channels which can be added or dropped is smaller than the number of channels in which a wavelength division multiplexed signal can be transmitted by the optical transmission apparatus 1.

To the transponders 4-1 to 4-N in the first embodiment, transmission wavelengths at every N-channel interval of wavelength allocates $\lambda 1$ to $\lambda m$ (m>N) as wavelength division multiplex signals are allocated. For example, where the number N is set to N=8 as described above, the wavelengths $\lambda 1$, $\lambda 9$, $\lambda 17$, . . . are allocated to the transponder 4-1; the wavelengths $\lambda 2$, $\lambda 10$, $\lambda 18$, . . . are allocated to the transponder 4-2; and the wavelengths $\lambda 8$, $\lambda 16$, $\lambda 24$, . . . are allocated to the transponder 4-8.

The optical add/drop section 2 is provided as a colorless OADM described hereinabove in the optical network and includes a wavelength selective optical switch (WSS) 2a, an optical coupler 2b, and a colorless AWG (Colorless Arrayed Waveguide Grating) 2c. The wavelength selective optical switch 2a is a dropping section which includes an input port-land has, as output ports O thereof, a transit port or through port OT and a plurality of (here, N=8) drop ports OD. The optical add/drop section 2 can arbitrarily switch output optical wavelengths to be outputted from the transit port OT and the drop ports OD thereof from within the multiplexed wavelengths in the WDM optical signal inputted from the input port 1.

For example, the wavelength selective optical switch 2a can set an optical wavelength to be transmitted and outputted through the transit port OT from within the multiplexed wavelengths in the WDM optical signal inputted from the input port 1 and set optical wavelengths to be dropped through the drop ports OD under the control of the network management and control section 5. It is to be noted that optical signals dropped through the drop ports OD are received by the transponders 3-1 to 3-N as corresponding optical reception sections.

It is to be noted that the wavelength selective optical switch 2a is an example of a dropping section which arbitrarily switches light inputted thereto from the input port 1 in a unit of a wavelength so as to be outputted to one of the transit port OT and the drop ports OD serving as output ports. However, the dropping section may have some other configuration than the wavelength selection optical switch.

Meanwhile, the optical coupler 2b multiplexes light outputted through the transit port OT of the WSS 2a and light from the colorless AWG 2c described below and outputs the multiplexed light. Thus, the optical coupler 2b is a first multiplexer for multiplexing light from the transit port of the WSS 2a and light from the add ports of the optical add/drop section 2.

The colorless AWG 2c has N (=8) input ports as add ports and one output port. In particular, the add ports (which compose the optical add/drop section 2) connected to the transponders 4-1 to 4-8 are associated with the eight input ports of the colorless AWG 2c.

Further, the colorless AWG 2c is configured such that the FSR (cyclic intervals of wavelengths) of the eight input ports is equal to eight times the channel interval of the wavelength division multiplex signal. In other words, input wavelengths to the eight input ports have an 8-channel interval from each other, Optical signals inputted from the input ports serving as add ports are multiplexed and outputted to the optical coupler 2b. Consequently, light of all channels in the channel allocations forming the wavelength division multiplex signal from the eight input ports can be added.

At this time, the input ports of the colorless AWG 2c have a transmission bandwidth (Passband). Consequently, in a process wherein optical signals of the channels from the transponders 4-1 to 4-8 are wavelength division multiplexed by the colorless AWG 2c and outputted to the optical coupler 2b in order to carry out an adding process, the feet of a spectrum of the optical signals of the channels of the add light can be deleted.

As an example, an optical phase modulation signal has a spread of a spectrum of a width corresponding to a frequency difference corresponding to a bit rate on the opposite sides of a center frequency. For example, as seen from an arrow mark B of FIG. 3, a signal having a bit rate of 10 Gb/s has a spread of a spectrum of a frequency difference of 10 Gb/s, but as seen from another arrow mark A of FIG. 3, an optical phase modulation signal of another bit rate of 40 Gb/s or the like has a spread of a spectrum corresponding to a frequency difference of 40 GHz corresponding to the bit rate on the opposite sides of a center frequency. The optical phase modulation signal further has, on the opposite outer sides of the spreads of the spectrum, such a sideband as denoted by a double-sided arrow mark B in FIG. 4(a).

Figure 3:
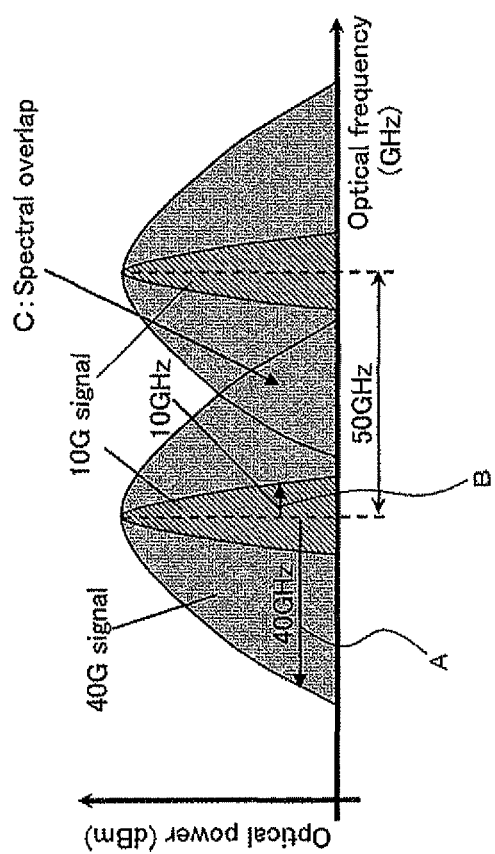
FIG. 3 is a graph illustrating occurrence of crosstalk between adjacent channels which may make a cause of degradation of the transmission quality.

It is assumed to wavelength division multiplex optical signals of a plurality of channels each of which includes an optical signal having a spread of a spectrum including such sidebands as described above while the frequency difference between adjacent channels is approximately 50 GHz. At this time, although it is estimated that, where the optical signal has a bit rate of 10 Gb/s as seen in FIG. 3, crosstalk between adjacent channels does not become a significant problem, where the bit rate becomes as high as approximately 40 Gb/s, it is estimated that occurrence of crosstalk between adjacent channels makes a cause of degradation of the transmission quality.

In contrast, since the feet of the spectrum of each of the optical signals from the transponders 4-1 to 4-8 are deleted and then the resulting optical signals are wavelength division multiplexed and then transmitted, occurrence of crosstalk between adjacent optical channels is suppressed to improve the transmission quality. In other words, the colorless AWG 2c described above is a spectrum foot removing section provided on the input side of the optical coupler 2b and adapted to remove the feet of the spectra of light inputted from the add ports to the optical coupler 2b.

It is to be noted that an optical amplifier 6a amplifies an optical signal inputted thereto through an input side transmission line not shown and introduces the amplified optical signal to the WSS 2a, and another optical amplifier 6b amplifies an optical signal outputted from the optical coupler 2b and outputs the amplified optical signal to an output side transmission line not shown.

In the optical transmission apparatus 1 configured in such a manner as described above, light of a preset wavelength from within wavelength division multiplexed signal light from the input side optical transmission line not shown is branched (dropped) by the WSS 2a and is outputted to the transponders 3-1 to 3-N through the drop ports OD. On the other hand, light of wavelengths to be outputted to the optical transmission light on the downstream side is outputted through the through port OT.

Meanwhile, light inputted from the transponders 4-1 to 4-N through the add ports is inputted through the input ports of the colorless AWG 2c, and light of wavelengths is multiplexed after the foot regions of the spectra thereof are deleted. Then, the multiplexed light is outputted to the optical coupler 2b. Consequently, while the optical coupler 2b multiplexes the light from the through port and the light from the add ports, overlaps of the spectra between adjacent wavelengths can be reduced significantly in comparison with those where light from the add ports is multiplexed collectively by an optical coupler.

Figure 2:
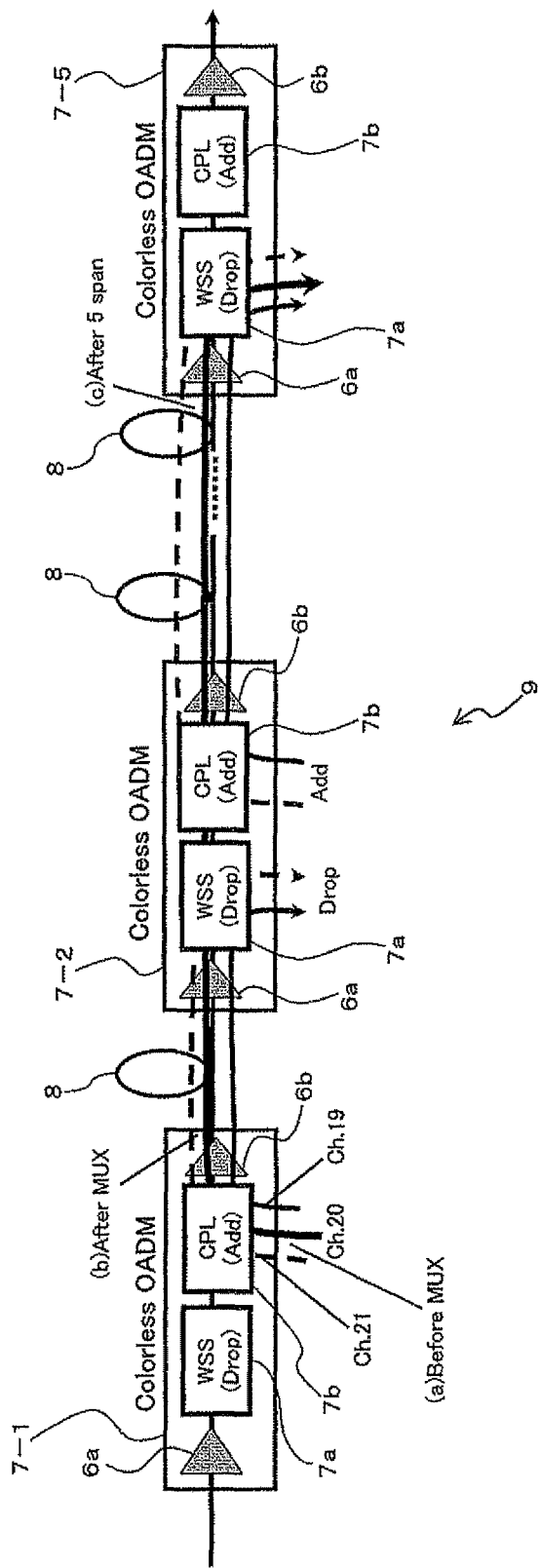
FIG. 2 is a block diagram showing an example of a configuration in contrast to the first embodiment.

FIG. 2 illustrates an optical network 9 wherein OADM devices 7-1 to 7-5 are connected through an optical transmission line 8 as an example of a configuration in contrast to the optical add/drop section 2 of the first embodiment. Where a transmission interval over which adjacent ones of the OADM devices 7-1 to 7-5 are connected to each other by the optical transmission line 8 is represented as one span, the optical network 9 has transmission intervals of five spans from the OADM device 7-1 to the OADM device 7-5. It is to be noted that the OADM devices 7-3 and 7-4 are omitted in FIG. 2.

Here, each of the OADM devices 7-1 to 7-5 illustrated in FIG. 2 includes a WSS 7a for separating drop light to drop ports not illustrated and through-light to a through-port from input light, and an optical coupler 7b for multiplexing light from the through-port and light from the channels from the add ports. Thus, while each of the OADM devices 7-1 to 7-5 has a number of ports (for example, eight ports) for add/drop smaller than 40 channels, it can add/drop light of arbitrary wavelengths.

For example, where the channel allocation of a wavelength division multiplexed signal transmitted by the optical network 9 is set, for example, such that it has 40 channels while the channel interval is a frequency difference of 50 GHz, it is assumed that the optical network 9 is set such that light of the channels #19 and #21 is transmitted through the transmission intervals of five spans from the OADM device 7-1 to the OADM device 7-5 while light of the channel #20 which is adjacent the channels #19 and #21 is dropped and added for each of the transmission intervals of the spans.

Figure 4:
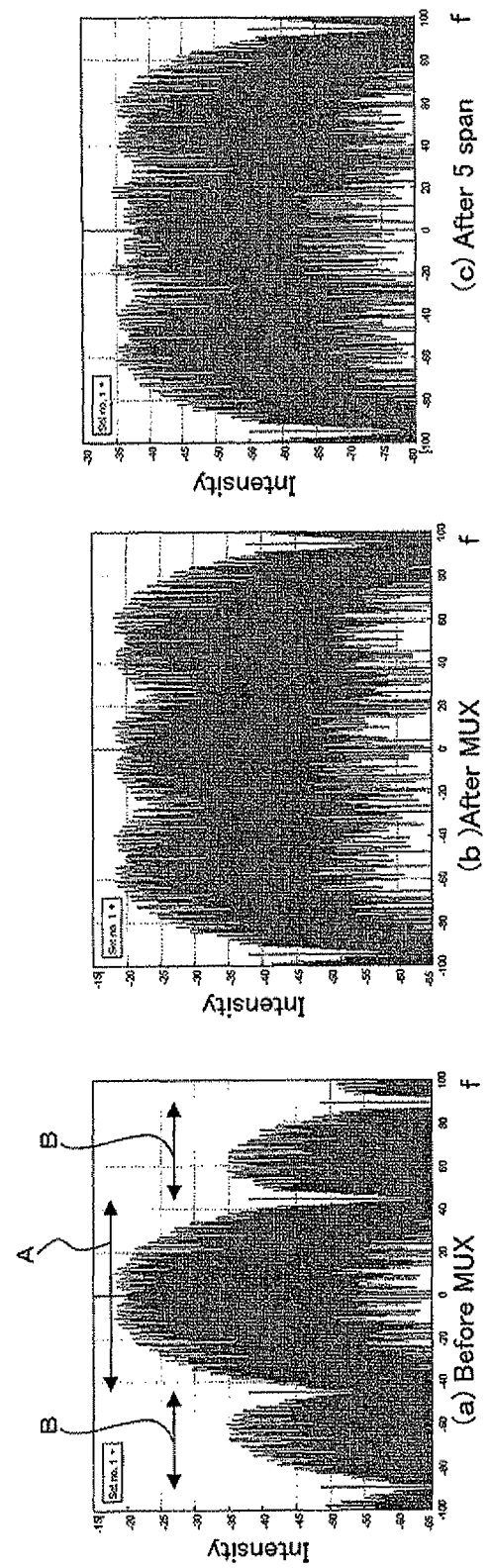
FIGS. 4(a) to 4(c) are views illustrating occurrence of crosstalk between adjacent channels which may make a cause of degradation of the transmission quality.

In this instance, when light of the channel #20 is added by each of the OADM devices 7-1 to 7-5, different from that of the case of the present embodiment described above, the light is multiplexed with light from the WSS 7a by the optical coupler 7b while light in such foot regions of add light as indicated by B in FIG. 4(a) remains not deleted. Consequently, such an overlap of spectra as indicated by C in FIG. 3 appears between the add light and the light of the adjacent channels #19 and #21, and this makes a factor of waveform degradation by crosstalk (refer to FIG. 4(b)).

Figure 5:
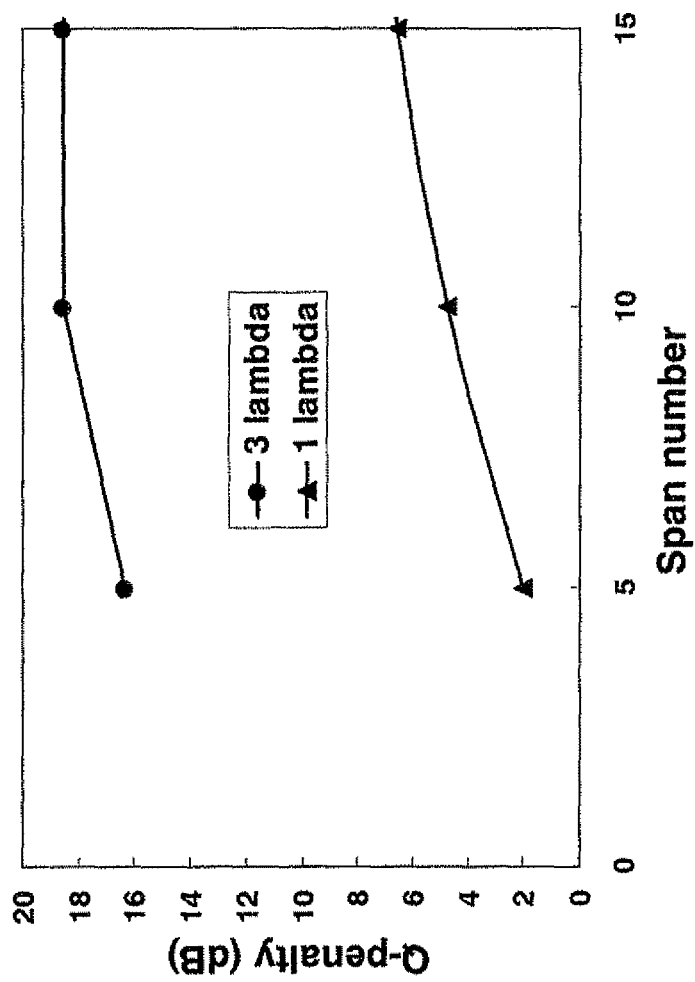
FIG. 5 is a graph illustrating occurrence of crosstalk between adjacent channels which may make a cause of degradation of the transmission quality.

Such waveform degradation by crosstalk as just described above becomes prominent particularly as the transmission intervals increase like the channels #19 and #21 and as the frequency in which light of adjacent channels is to be dropped and added increases (refer to FIG. 4(c)). Also regarding the signal quality (Q penalty), the degradation degree increases as the number of transmission intervals increases and as the number of adjacent channels increases similarly as seen in FIG. 5.

In contrast, in the case of the first embodiment, since light to be added is wavelength division multiplexed with the feet of a spectrum thereof deleted by the colorless AWG 2c and is then transmitted, occurrence of crosstalk between adjacent optical channels can be suppressed to improve the transmission quality.

In this manner, according to the first embodiment, there are advantages that, while it has adding and dropping functions, it can achieve reduction in cost of the apparatus and that it can remarkably suppress signal degradation of a comparatively high bit rate signal such as a signal of 400 Gbit/s.

Further, since the optical add/drop section 2 has a simplified configuration composed of the colorless AWG 2c and the optical coupler 2b without provision of a separate WSS in order to multiple add light with light from the through port, the production cost of the apparatus and so forth can be suppressed significantly.

[b] Second Embodiment

Figure 6:
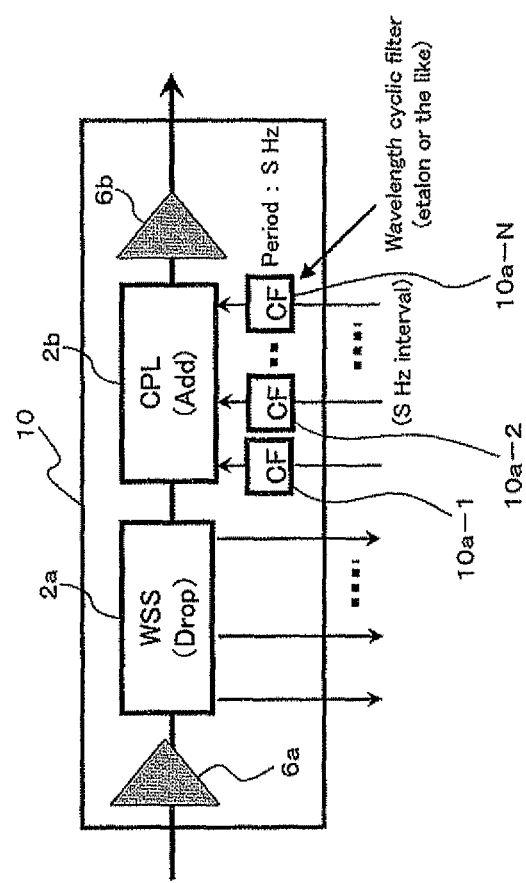
FIG. 6 is a block diagram showing an optical adding and dropping device according to a second embodiment.
Figure 7:
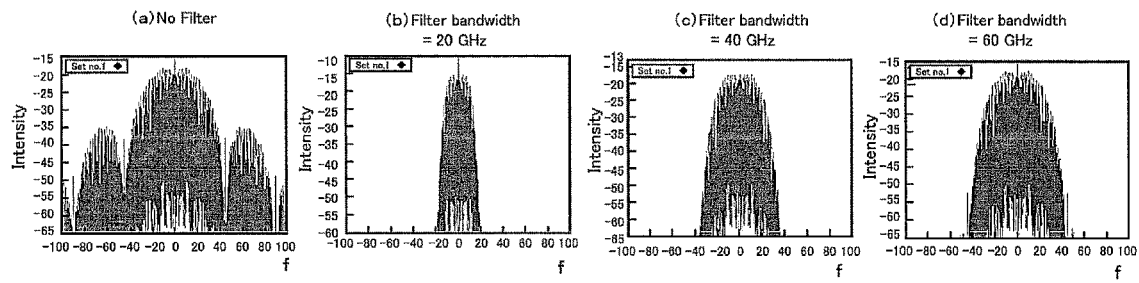
FIGS. 7(a) to 7(d), 8(a) to 8(d), 9(a) to 9(d) and 10 are views illustrating working-effects of the second embodiment.
Figure 8:
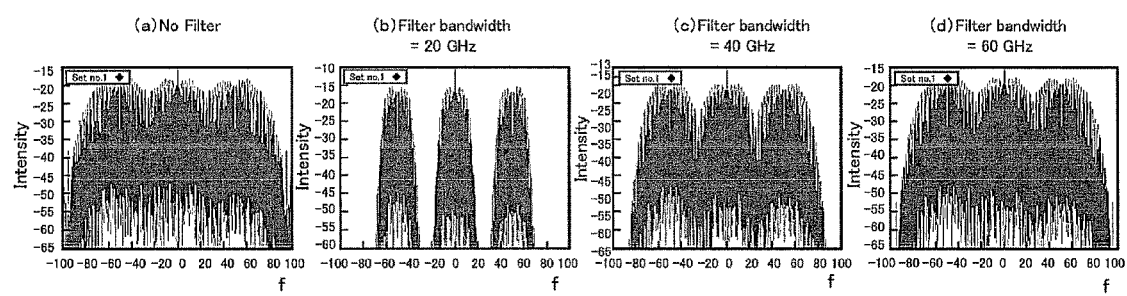
Figure 9:
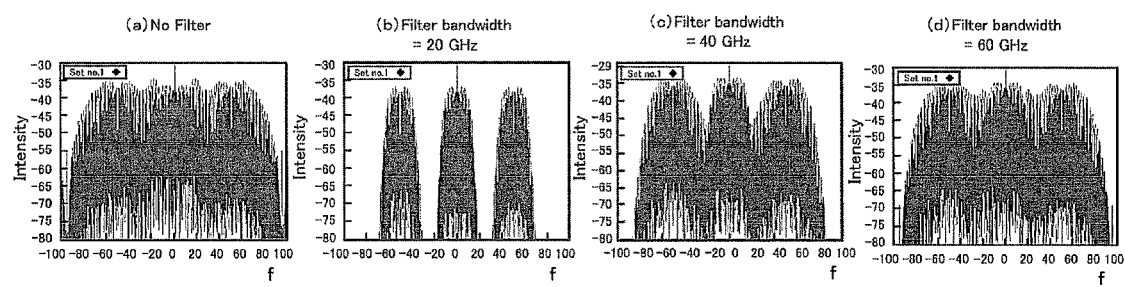

FIG. 6 illustrates an optical adding and dropping device 10 according to a second embodiment of the present invention. The optical adding and dropping device 10 shown in FIG. 6 can be applied in place of the optical add/drop device 2 in the optical transmission apparatus 1 described hereinabove with reference to FIG. 1. The optical adding and dropping device 10 shown in FIG. 6 is different from that of the first embodiment described hereinabove in that it includes a number of cyclic filters (CF) 10a-1 to 10a-N equal to the number of add ports as a spectrum foot removing section in place of the colorless AWG 2c. It is to be noted that, in FIG. 6, like reference characters to those in FIG. 1 denote substantially like elements.

The cyclic filters 10a-1 to 10a-N are a plurality of optical filters which transmit therethrough light from a plurality of add ports and are cyclic filters having periodic transmission characteristics for every one interval of channels which can be wavelength division multiplexed in light inputted to the input port 1 of the WSS 2a. As the cyclic filters 10a-1 to 10a-N, for example, an et al on (Fabry-Perot) type filter, a Mach-Zehnder type filter and so forth are known.

In particular, the cyclic filters 10a-1 to 10a-N are set in an associated relationship such that the bandwidth (pass band) of the transmission wavelength characteristic coincides with the channel allocation of the wavelength division multiplexed optical signal, and the characteristics of the cyclic filters 10a-1 to 10a-N such as the transmission wavelength width and so forth are set such that the spectrum feet can be deleted sufficiently although the degradation of optical signals from the transponders is comparatively small.

Consequently, for example, in the transponders 4-1 to 4-8 (N=8, refer to FIG. 1) corresponding to the eight add ports, even if light of an arbitrary wavelength is outputted as add light without depending upon the corresponding port position, since the cyclic filters 10a-1 to 10a-8 can remove the spectrum feet of the outputted add light efficiently, occurrence of crosstalk between adjacent channels can be suppressed to improve the transmission characteristic similarly as in the case of the first embodiment described hereinabove.

FIGS. 7(a) to 9(d) illustrate application effects (optical spectra) of the present invention to a DPSK signal wavelength division multiplexed at intervals of 50 GHz and having a bit rate of 40 Gbit/s.

In particular, FIG. 7(a) illustrates an optical spectrum characteristic of simple add channel light at a preceding stage to multiplexing by the optical coupler 2b where the configuration of FIG. 2 which does not include the cyclic filters 10a-1 to 10a-N is used. Meanwhile, FIGS. 7(b) to 7(d) illustrate optical spectrum characteristics of simple add channel light at a preceding stage to multiplexing by the optical coupler 2b where the filter band width of the cyclic filters 10a-1 to 10a-N is set to 20 GHz, 40 GHz and 60 GHz, respectively.

FIGS. 8(a) to 8(d) illustrate optical spectrum characteristics after multiplexing by the optical coupler 2b as light to which three successive channels (refer to, for example, the channels #19 to #21 shown in FIG. 2) are added by the optical coupler 2b. In particular, FIG. 8(a) illustrates an optical spectrum characteristic where the configuration of FIG. 2 which does not include the cyclic filters 10a-1 to 10a-N is used, and FIGS. 8(b) to 8(d) illustrate optical spectrum characteristics where the cyclic filters 10a-1 to 10a-N wherein the filter bandwidth is set to 20 GHz, 40 GHz and 60 GHz, respectively, are included.

Further, FIGS. 9(a) to 9(d) illustrate optical spectrum characteristics of light of three successive channels when light is transmitted through five spans after it is multiplexed by the optical coupler 2b. In particular, FIG. 9(a) illustrates an optical spectrum characteristic where the configuration of FIG. 2 which does not include the cyclic filters 10a-1 to 10a-N is used, and FIGS. 9(b) to 9(d) illustrate optical spectrum characteristics where the cyclic filters 10a-1 to 10a-N wherein the filter bandwidth is set to 20 GHz, 40 GHz and 60 GHz, respectively, are included.

In the case of the configuration of FIG. 2 which does not use the cyclic filters 10a-1 to 10a-N, overlaps of spectra from adjacent channels can be seen conspicuously as seen in FIGS. 7(a), 8(a) and 9(a). Also in the case wherein the filter bandwidth of the cyclic filters is comparatively great (60 GHz), overlaps of spectra from adjacent channels can be seen conspicuously as seen in FIGS. 7(d), 8(d) and 9(d) In contrast, where the filter bandwidth is comparatively small (20 GHz), it can be recognized that optical spectrum narrowing of the signals occur conspicuously as seen in FIGS. 7(b), 8(b) and 9(b).

Then, by tradeoff of both effects, an optimum filter width in this example is in the proximity of 40 GHz. In particular, by applying the cyclic filters 10a-1 to 10a-N whose filter characteristic is set optimally, even if the number of spans increases, waveform degradation can be suppressed as seen from FIGS. 7(c), 8(c) and 9(c). It is to be noted that, since it can be estimated that the filter optimum value may vary depending upon the bit rate, modulation method, wavelength interval and so forth, it can be set suitably.

Figure 10:
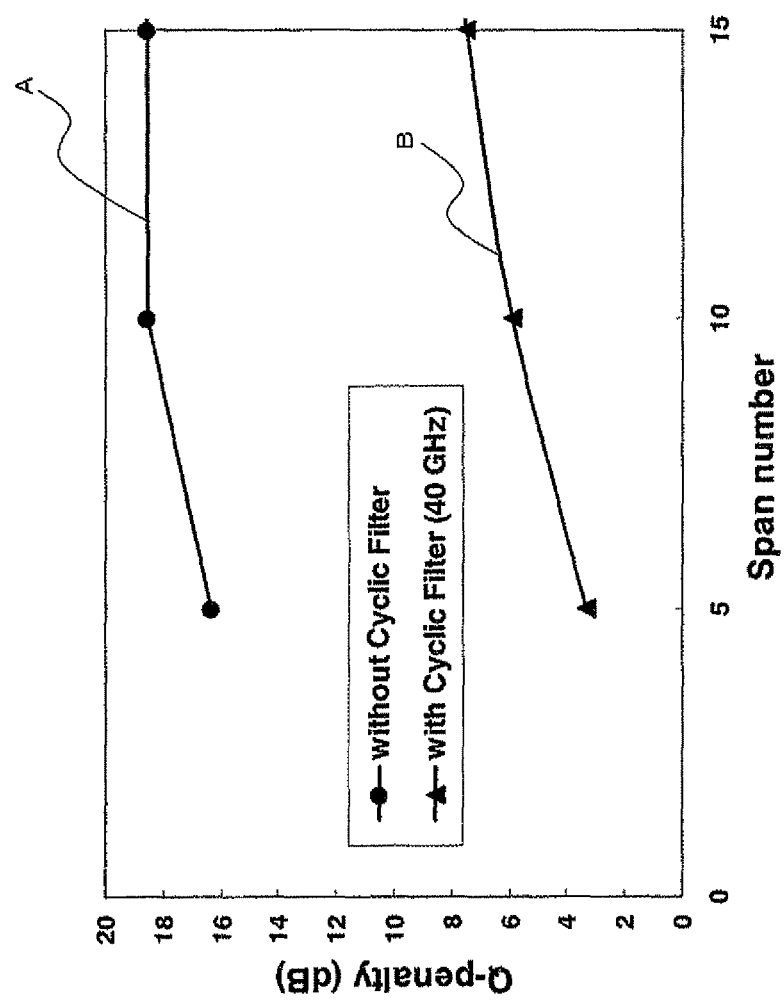

FIG. 10 illustrates variations of the Q penalty by the transmission span number for comparison between a case (B) wherein the cyclic filters 10a-1 to 10a-N (bandwidth: 40 GHz) are applied to a DPSK signal wavelength division multiplexed at 50 GHz intervals and having a bit rate of 40 Gbit/s and another case (A) wherein the cyclic filters 10a-1 to 10a-N are not applied. As seen from the curve A in FIG. 10, with the configuration illustrated in FIG. 2 which does not apply the cyclic filters 10a-1 to 10a-N, the Q penalty exhibits comparatively high values. In contrast, it can be recognized that, where the cyclic filters 10a-1 to 10a-N are applied, the Q penalty is improved significantly as seen from the curve B in FIG. 10, and the transmission quality can be improved significantly.

In this manner, the second embodiment exhibits, in addition to advantages similar to those of the first embodiment described hereinabove, an advantage that light of an arbitrary wavelength can be introduced to an add port without being restricted by the position of the port and the degree of freedom in utilization of the add ports of the optical adding and dropping device can be enhanced.

[b1] First Modification to the Second Embodiment

Figure 11:
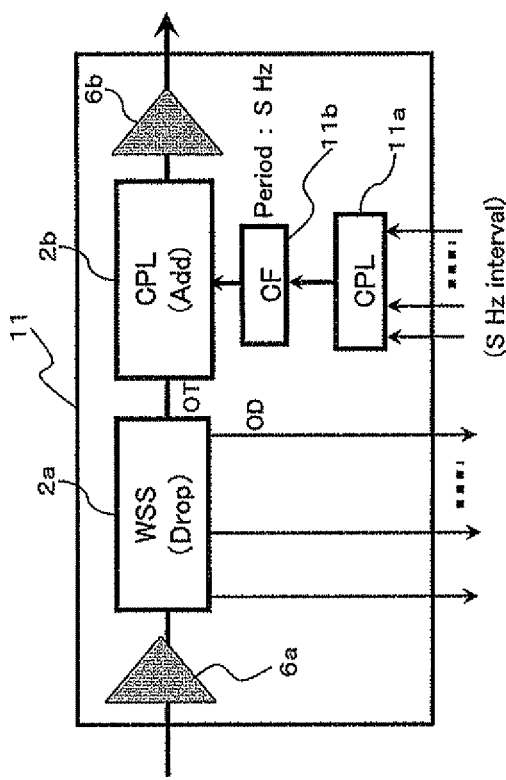
FIGS. 11 to 13 are block diagrams showing modifications to the second embodiment.

FIG. 11 illustrates an optical adding and dropping device 11 according to a first modification to the second embodiment. Referring to FIG. 11, the optical adding and dropping device 11 shown includes an optical coupler 11a and a single cyclic filter 11b as a spectrum foot removing section in place of the number of cyclic filters 10a-1 to 10a-N equal to the number of add ports described hereinabove with reference to FIG. 6.

The optical coupler 11a is a second multiplexer for multiplexing light from a plurality of add ports, and the cyclic filter 11b is an optical filter which transmits light from the optical coupler 11a therethrough and particularly is a periodic filter having a periodic transmission characteristic for each interval of adjacent channels. The cyclic filter 11b may be configured similarly to one of the number of cyclic filters 10a-1 to 10a-N equal to the number of add ports described hereinabove.

In the optical adding and dropping device 11 configured in such a manner as described above, the spectrum feet of add light multiplexed by the optical coupler 11a can be removed collectively. Consequently, while the waveform degradation can be reduced from that in the case the device of FIG. 2 (refer to reference numeral 7), the installation number of cyclic filters can be reduced from that in the case of FIG. 6 described hereinabove and reduction of the apparatus scale and reduction of the cost can be achieved.

[b2] Second Modification to the Second Embodiment

Figure 12:
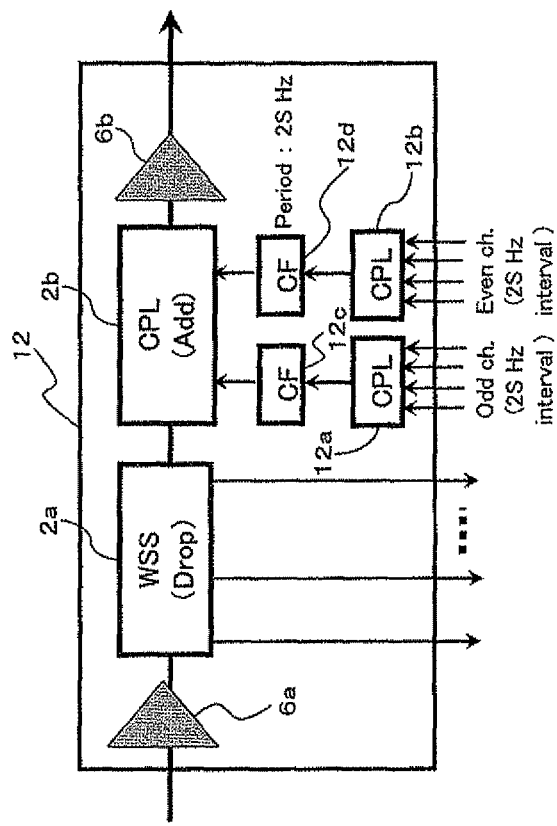

FIG. 12 illustrates an optical adding and dropping device 12 according to a second modification to the second embodiment. Referring to FIG. 12, the optical adding and dropping device 12 shown may include multiplexers 12a and 12b and cyclic filters 12c and 12d for odd-numbered and even-numbered channels as a spectrum foot removing section such that light of odd-numbered channels and light of even-numbered channels are multiplexed separately from each other to remove the spectrum feet.

The odd-numbered channel multiplexer 12a and the even-numbered channel multiplexer 12b multiplex light of odd-numbered channels and light of even-numbered channels, respectively, from within light from a plurality of add ports. Meanwhile, the cyclic filter 12c is an optical filter which transmits light from the odd-numbered channel multiplexer 12a therethrough and particularly is an odd-numbered channel filter having a periodic transmission characteristic for each wavelength interval of the odd-numbered channels. The cyclic filter 12d is an optical filter which transmits light from the even-numbered channel multiplexer 12b therethrough and particularly is an even-numbered channel filter having a periodic transmission characteristic for each interval of the even-numbered channels.

In other words, while both of the cyclic filters 11a and 11b described hereinabove with reference to FIGS. 6 and 11, respectively, have a periodic transmission characteristic for each unit channel interval (frequency difference: S [Hz]), both of the cyclic filters 12c and 12d shown in FIG. 12 have a periodic transmission characteristic for each two-channel interval (frequency difference: 2S [Hz]). It is to be noted that characteristics of the cyclic filters 12c and 12d such as the transmission wavelength width are set such that the spectrum feet can be deleted sufficiently although the degradation of optical signals of corresponding wavelengths from the transponders is comparatively small.

Consequently, light outputted from the cyclic filter 12c to the optical coupler 2b can be formed as light obtained by wavelength division multiplexing light of odd-numbered channels after the spectrum feet thereof are removed. Meanwhile, light outputted from the cyclic filter 12d to the optical coupler 2b can be formed as light obtained by wavelength division multiplexing light of even-numbered channels after the spectrum feet thereof are removed. Then, the optical coupler 2b multiplexes the optical signals from the cyclic filters 12c and 12d together with the optical signal from the through port OT. Consequently, the optical coupler 2b can output a wavelength division multiplexed signal from which overlaps of the spectra between adjacent channels are removed similarly as in the case of the second embodiment described hereinabove.

Accordingly, with the second modification, since the cyclic filters 12c and 12d are disposed in a state wherein the interval between adjacent channels is comparatively great, the feet of the optical spectrum can be deleted with a higher degree of efficiency. Further, since the installation number of cyclic filters is reduced from that shown in FIG. 6, there is an advantage also in that the cost required for the apparatus can be reduced. However, it is necessary to allocate odd-numbered signals to those add ports to which the inputs of the odd-numbered channel multiplexer 12a are connected and allocate even-numbered wavelengths to those add ports to which the inputs of the even-numbered channel multiplexer 12b are connected.

[b3] Third Modification to the Second Embodiment

Figure 13:
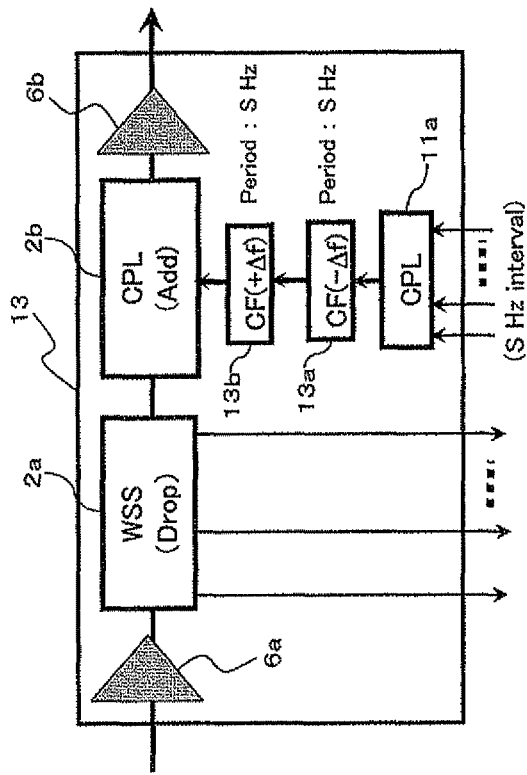

FIG. 13 illustrates an optical adding and dropping device 13 according to a third modification to the second embodiment. Referring to FIG. 13, the optical adding and dropping device 13 shown is different from the optical adding and dropping device 11 described hereinabove with reference to FIG. 11 in that it includes two cyclic filters 13a and 13b wherein the center wavelength of the transmission characteristic thereof is shifted to the longer wavelength side and the shorter wavelength side from the optical wavelength allocation of the wavelength division multiplex signal, respectively. The two cyclic filters 13a and 13b and the optical coupler 11a cooperate to configure a spectrum foot removing section. It is to be noted that, in FIG. 13, like reference characters denote like elements to those of FIG. 11.

The cyclic filter 13a is a first filter which receives multiplexed light of light from the plural add ports as an input thereto from the optical coupler 11a and transmits the light from the plural add ports therethrough, and has a transmission characteristic whose center wavelength is shifted by $\Delta f$, for example, in the shorter wavelength direction from the wavelength allocation of the wavelength division multiplexing (CF−$\Delta f$). In other words, the transmission center wavelength of the cyclic filter 13a is shifted by the predetermined value $\Delta F$ to the shorter wavelength side while the shape itself of the filter transmission characteristic of the cyclic filter 13a is same as that of the cyclic filter 11b shown in FIG. 11.

The cyclic filter 13b is a second filter which transmits output light from the cyclic filter 13a therethrough and has a transmission characteristic whose center wavelength is shifted by the same amount ($\Delta f$) but in the opposite direction to that of the cyclic filter 13a (in this instance, in the direction toward the longer wavelength side) from the wavelength allocation of the wavelength division multiplexing (CF+$\Delta f$). In other words, the transmission center wavelength of the cyclic filter 13b is shifted by the predetermined value $\Delta f$ to the longer wavelength side while the shape itself of the filter transmission characteristic of the cyclic filter 13b is same as that of the cyclic filter 11b shown in FIG. 11.

Figure 14:
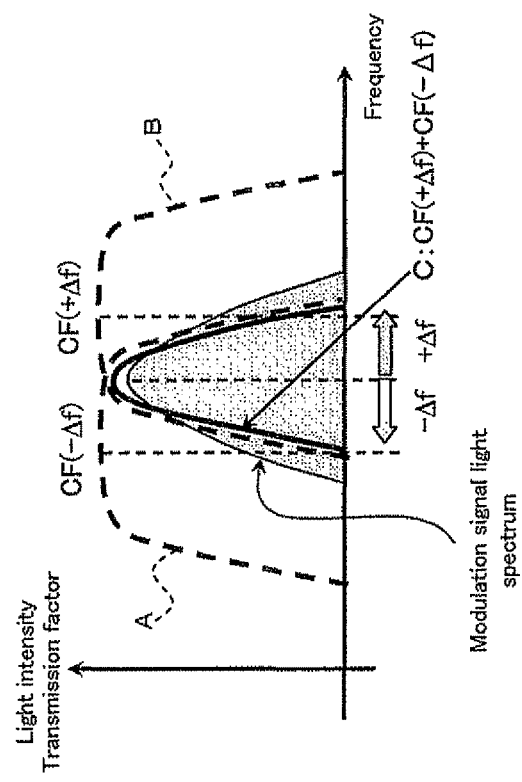
FIG. 14 is a graph illustrating an acting function of the modification shown in FIG. 13.

Consequently, the light intensity characteristic of light of optical wavelengths which is transmitted through both of the cyclic filters 13a and 13b becomes such a characteristic C as seen in FIG. 14 which is an overlap of transmission wavelength characteristics indicated by curves A and B in FIG. 14. By adjusting the shift amount $\Delta f$ of the transmission center wavelengths of such two cyclic filters 13a and 13b as just described, the transmission wavelength characteristic C provided by the cooperation of the cyclic filters 13a and 13b can be adjusted to remove the feet of the spectrum of the optical signal with a higher degree of efficiency. It is to be noted that, where the cyclic filter 13a is configured such that the transmission center wavelength is shifted to the longer wavelength side conversely to that in the case described above, the cyclic filter 13b is configured such that the transmission center wavelength is shifted to the shorter wavelength side.

By varying the bandwidth of the cyclic filters 1a and 13b in this manner, the spectrum of the optical signal can be optimized. It is to be noted that since the optimum value of the bandwidth of the cyclic filters 13a and 13b varies depending upon such conditions as the bit rate, modulation method and wavelength interval, the bandwidth of the filters is adjusted in response to the conditions. While, in the example of FIG. 13, two wavelength periodic filters are disposed at different stages and have center wavelengths displaced from each other to vary the total wavelength bandwidth, the bandwidth of the filters may be adjusted by some other configuration.

It is to be noted that, while, in the third modification, the cyclic filters 13a and 13b at two stages are used in place of the cyclic filter 11b shown in FIG. 11 to optimize the filter characteristic, a similar technique may be applied to the cyclic filters 10a and 12c, 12d shown in FIGS. 6 and 12, respectively, to achieve optimization of the filter characteristic.

[c] Third Embodiment

Figure 15:
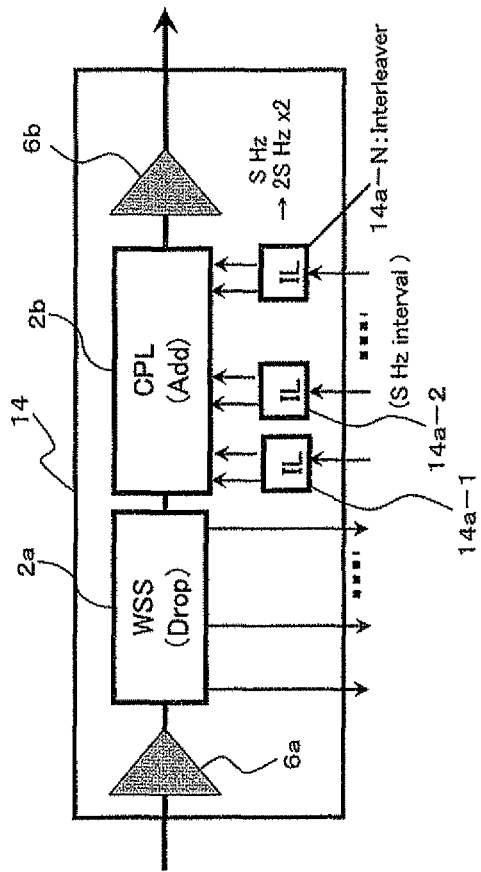
FIG. 15 is a block diagram showing an optical adding and dropping device according to a third embodiment.

FIG. 15 illustrates an optical adding and dropping device 14 according to a third embodiment of the present invention. Referring to FIG. 15, the optical adding and dropping device 14 shown includes, in place of a number of cyclic filters 10a-1 to 10a-N equal to the number of add ports described hereinabove with reference to FIG. 6, a number of interleavers 14a-1 to 14a-N equal to the number of add ports serving as a spectrum foot deletion section. In particular, the N interleavers 14a-1 to 14a-N accept light from a plurality of (N) add ports. It is to be noted that, in FIG. 15, like reference characters denote like elements to those of FIG. 6.

The interleavers 14a-1 to 14a-N have two outputs of 2S hertz with respect to one input of S hertz where S is the channel interval of wavelength division multiplexing. The interleavers 14a-1 to 14a-N accept light from corresponding add ports to the one input thereof and output, where the light from the add port is of an odd-numbered channel, the light from one of the two outputs thereof but output, where the light from the add port is of an even-numbered channel, the light from the other one of the two outputs thereof.

In other words, the interleavers 14a-1 to 14a-N can separate even-numbered channel light and odd-numbered channel light from each other using the output destinations of the two outputs. At this time, the two outputs of the interleavers 14a-1 to 14a-N have a pass band for removing the feet of a spectrum. Accordingly, light from corresponding add ports outputted from the interleavers 14a-1 to 14a-N is outputted to the optical coupler 2b at the succeeding stage after the feet thereof are removed.

The optical coupler 2b multiplexes light from the through port of the WSS 2a and light of the two outputs from the N interleavers 14a-1 to 14a-N and outputs the multiplexed light as light to be outputted to the output side transmission line to the optical amplifier 6b.

Consequently, also with the third embodiment, occurrence of crosstalk between adjacent channels can be suppressed to enhance the transmission quality similarly as in the case of the second embodiment described hereinabove with reference to FIG. 6.

[c1] First Modification to the Third Embodiment

Figure 16:
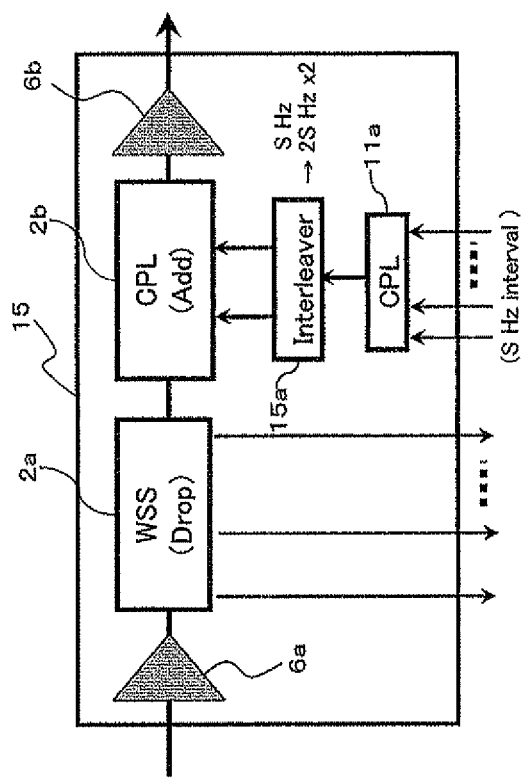
FIGS. 16 to 19 are block diagrams showing modifications to the third embodiment.

FIG. 16 illustrates an optical adding and dropping device 15 according to a first modification to the third embodiment. Referring to FIG. 16, the optical adding and dropping device 15 shown includes an interleaver 15a in place of the cyclic filter 11b described hereinabove with reference to FIG. 11. The interleaver 15a and the optical coupler 11a which serves as a second multiplexer cooperate to implement a function as a spectrum foot removing section. It is to be noted that, in FIG. 16, like reference characters to those in FIG. 11 denote substantially like elements.

The interleaver 15a has two outputs of twice 2S hertz with respect to one input of S hertz where S is the channel interval of wavelength division multiplexing. The interleaver 15a accepts light from the optical coupler 11a at the one input thereof and outputs light of the odd-numbered channels from one of the two outputs thereof but outputs light of the even-numbered channels from the other one of the two outputs thereof, to the optical coupler 2b which serves as a first multiplexer.

In other words, the interleaver 15a can separate even-numbered channel light and odd-numbered channel light from each other depending upon the output destination of one of the two outputs. At this time, the two outputs of the interleaver 15a have a pass band for removing the feet of a spectrum. Accordingly, light from the add ports outputted from the interleaver 15a is outputted to the optical coupler 2b at the succeeding stage after the feet thereof are removed in a unit of an optical wavelength component of each channel.

Consequently, also with the first modification to the third embodiment, occurrence of crosstalk between adjacent channels can be suppressed to enhance the transmission quality similarly as in the case of the third embodiment described hereinabove with reference to FIG. 15.

[c2] Second Modification to the Third Embodiment

Figure 17:
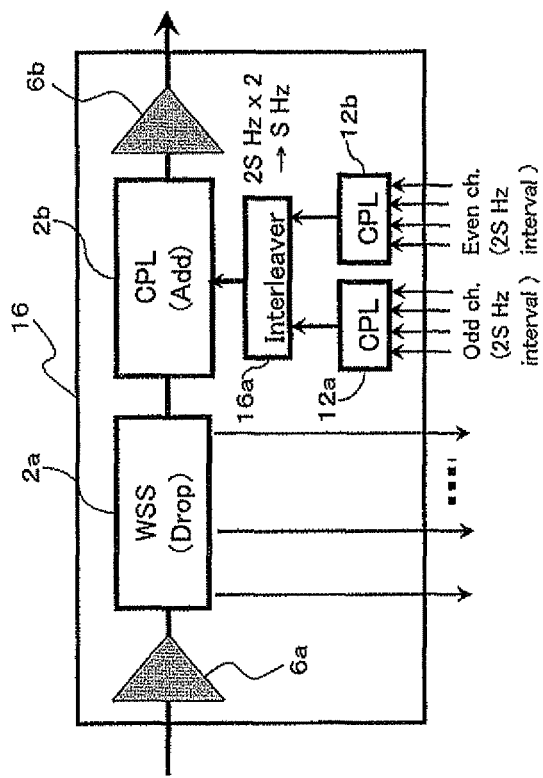

FIG. 17 illustrates an optical adding and dropping device 16 according to a second modification to the third embodiment. Referring to FIG. 17, the optical adding and dropping device 16 shown includes an odd-numbered channel multiplexer 12a and an even-numbered channel multiplexer 12b similar to those described hereinabove with reference to FIG. 12, and an interleaver 16a. The multiplexers 12a and 12b and the interleaver 16a cooperate to implement a function as a spectrum foot removing section. It is to be noted that, in FIG. 17, like reference characters to those in FIG. 12 denote substantially like elements.

The interleaver 16a has an output of S hertz with respect to two inputs of twice 2S hertz where S is the channel interval of wavelength division multiplexing. The interleaver 16a accepts light from the odd-numbered channel multiplexer 12a and the even-numbered channel multiplexer 12b at the two inputs thereof described hereinabove and outputs light of the channels from the one output thereof to the optical coupler 2b which serves as a first multiplexer.

In other words, multiplexed light of light of the channels inputted from the add ports is outputted from the interleaver 16a to the optical coupler 2b. At this time, from the output light to the optical coupler 2b, the spectrum feet are removed in a unit of an optical wavelength component of each channel depending upon the pass band which the interleaver 16a has.

Consequently, with the second modification to the third embodiment, although it is necessary to allocate the odd-numbered wavelengths to the add ports to which the inputs of the even-numbered channel multiplexer 12b are connected and allocate the even-numbered wavelengths to the add ports to which the inputs of the even-numbered channel multiplexer 12b are connected, since the interleaver 16a is disposed in a state wherein the interval between adjacent channels is great, the feet of the optical spectrum can be deleted with a higher degree of efficiency.

(c3) Third Modification to the Third Embodiment

Figure 18:
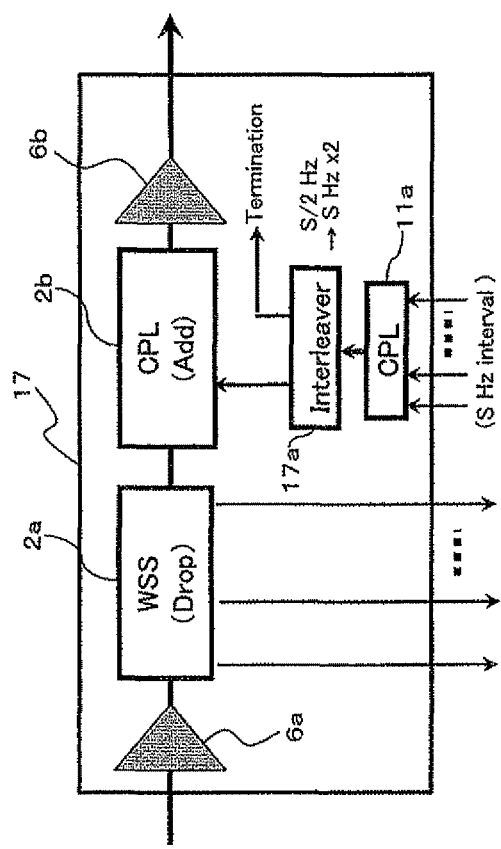

FIG. 18 illustrates an optical adding and dropping device 17 according to a third modification to the third embodiment. Referring to FIG. 18, the optical adding and dropping device 17 shown includes an interleaver 17a having a different function from that of the interleaver 15a described hereinabove with reference to FIG. 16. The interleaver 17a and the optical coupler 11a which serves as a second multiplexer cooperate to implement a function as a spectrum foot removing section. It is to be noted that, in FIG. 18, like reference characters to those in FIG. 16 denote substantially like elements.

The interleaver 17a has two outputs of S hertz with respect to one input of S/2 hertz where S is the channel interval of wavelength division multiplexing. The interleaver 17a accepts light from the optical coupler 11a at the one input thereof and outputs light of the channels from one of the two outputs thereof. From the two outputs of the interleaver 17a, even-numbered grids at intervals of S/2 hertz are introduced to the optical coupler 2b while odd-numbered grids ($\lambda 2i$-1) are used as a cutoff region. Therefore, the optical adding and dropping device 17 is effective where the feet of an optical spectrum are reduced steeply with a smaller bandwidth.

[c4] Fourth Modification to the Third Embodiment

Figure 19:
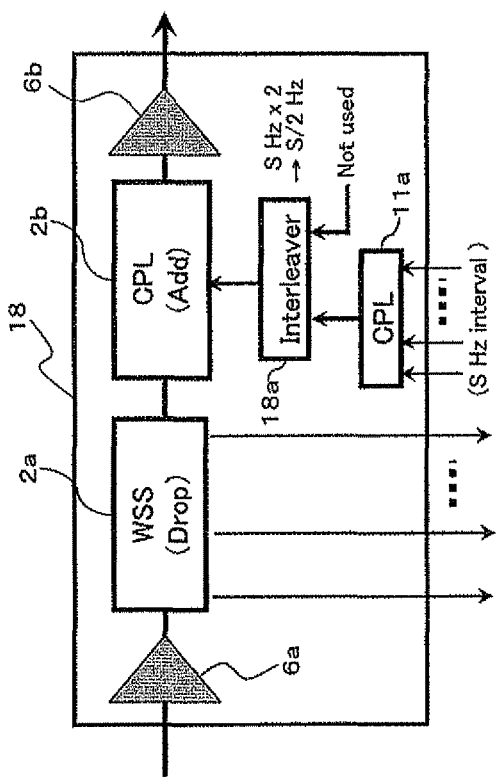

FIG. 19 illustrates an optical adding and dropping device 18 according to a fourth modification to the third embodiment. Referring to FIG. 19, the optical adding and dropping device 18 shown includes an interleaver 1a which is reversed in regard to a relationship of an input and an output from the interleaver 17a described hereinabove with reference to FIG. 18. The interleaver 18a and the optical coupler 11a which serves as a second multiplexer cooperate to implement a function as a spectrum foot removing section. It is to be noted that, in FIG. 19, like reference characters to those in FIG. 18 denote substantially like elements.

The interleaver 1a has one output of S/2 hertz with respect to two inputs of S hertz. The interleaver 1a accepts light from the optical coupler 11a as an input to one of the two inputs thereof and outputs light of each channel from the one output thereof to the optical coupler 2b. Also in this instance, for even-numbered grids of S/2 hertz, the two inputs to the interleaver 18a are introduced to the optical coupler 2b while, for odd-numbered grids, the two inputs to the interleaver 18a are used as a cutoff region. Therefore, the present fourth modification is effective where the feet of an optical spectrum are deleted steeply with a comparatively small bandwidth similarly to the third modification.

[d] Fourth Embodiment

Figure 20:
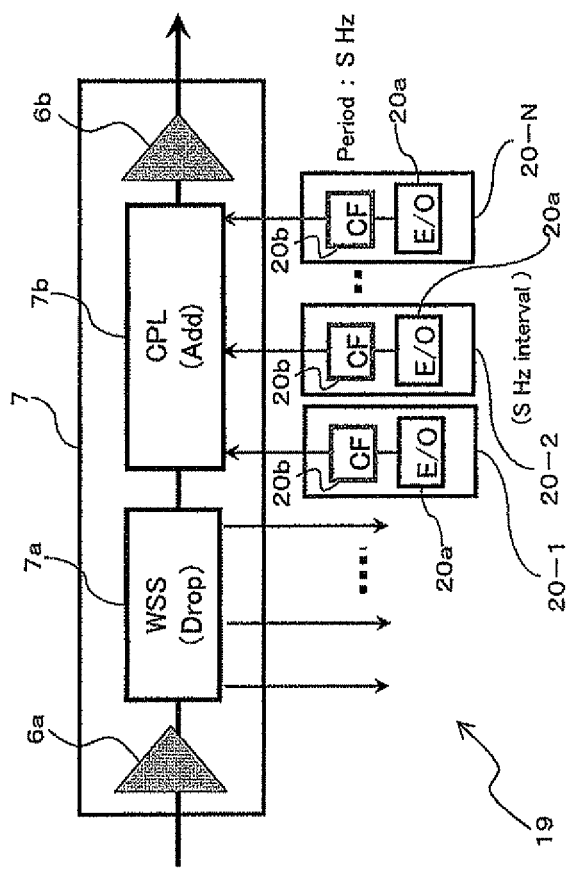
FIG. 20 is an optical transmission apparatus according to a fourth embodiment.

FIG. 20 illustrates an optical transmission apparatus 19 according to a fourth embodiment of the present invention.

Referring to FIG. 20, the optical transmission apparatus 19 shown is different from that described hereinabove with reference to FIG. 2 in that it includes an optical adding and dropping device 7 similar to that described hereinabove with reference to FIG. 2 and transponders 20-1 to 20-N having a function as the cyclic filters 10a-1 to 10a-N provided in the optical adding and dropping device 10 in the second embodiment described hereinabove with reference to FIG. 6.

In particular, the number of transponders (optical transmission sections) 20-1 to 20-N is equal to the plural number (N) of add ports provided for the optical adding and dropping device 7. Each transponder 20 includes a light source 20a capable of outputting an optical signal of a variable wavelength to be added from a corresponding add port, and a cyclic filter 20b serving as a spectrum foot removing section for removing the feet of a spectrum of light from the light source 20a and outputting the resulting light through the add port for transmission. It is to be noted that the cyclic filters 20b of the transponders 20-1 to 20-N individually correspond to the cyclic filters 10a-1 to 10a-N shown in FIG. 6 and have a basically similar function to that of the cyclic filters 10a-1 to 10a-N.

In the optical transmission apparatus 19 configured in such a manner as described above, even where such a configuration of the optical adding and dropping device 7 as described hereinabove with reference to FIG. 2 is applied, occurrence of crosstalk between adjacent channels can be suppressed by the transponders 20-1 to 20-N thereby to improve the transmission quality similarly as in the case of the second embodiment described hereinabove.

All examples and conditional language recited herein are intended for pedagogical purposes to aid the reader in understanding the inventions) and the concepts contributed by the inventor(s) to furthering the art, and are to be construed as being without limitation to such specifically recited examples and conditions, nor does the organization of such examples in the specification relate to a showing of the superiority and inferiority of the invention. Although the embodiments) has been described in detail, it should be understood that the various changes, substitutions, and alterations could be made hereto without departing from the spirit and scope of the invention(s).

What is claimed is:

1. An optical adding and dropping device, comprising:
a drop section including an input port and having a through port and a plurality of drop ports set as output ports;
a first multiplexer adapted to multiplex light from said through port and light from a plurality of add ports; and
a spectrum foot removing section provided on the input side of said first multiplexer and adapted to remove a self-spread of a channel light having a center frequency, the self-spread occurring on the opposite sides of the center frequency of each channel light to be inputted from said add ports to said first multiplexer,
wherein the center frequency is a fundamental frequency of the channel light, and sidebands of the fundamental frequency are excluded from the self-spread.

2. The optical adding and dropping device as claimed in claim 1, wherein a plural number of ports smaller than the number of channels provided for use in wavelength multiplexing are set for said drop ports and said add ports, respectively.

3. The optical adding and dropping device as claimed in claim 2, wherein each of said plural number of ports set for said drop ports and said add ports is set as a port for dropping or adding light of an arbitrary wavelength.

4. The optical adding and dropping device as claimed in claim 2, wherein said spectrum foot removing section is configured from a colorless array waveguide grating.

5. The optical adding and dropping device as claimed in claim 2, wherein said spectrum foot removing section is configured from a plurality of optical filters for individually transmitting light from said add ports therethrough, and each of said optical filters is a cyclic filter having a cyclic transmission characteristic for each channel interval of wavelength multiplexing of the light inputted to said input port.

6. The optical adding and dropping device as claimed in claim 2, wherein said spectrum foot removing section includes:
a second multiplexer adapted to multiplex light from said add ports; and
a cyclic filter which is an optical filter adapted to transmit light from said second multiplexer therethrough and has a cyclic transmission characteristic for each interval of adjacent ones of the channels.

7. The optical adding and dropping device as claimed in claim 2, wherein said spectrum foot removing section includes:
an odd-numbered channel multiplexer and an even-numbered channel multiplexers adapted to multiplex light from odd-numbered channels and even-numbered channels from within light from said add ports, respectively;
an odd-numbered channel filter adapted to transmit the light from said odd-numbered channel multiplexer therethrough and having a cyclic transmission characteristic for each interval of the odd-numbered channels; and
an even-numbered channel filter adapted to transmit light from said even-numbered channel multiplexer therethrough and having a cyclic transmission characteristic for each interval of the even-numbered channels.

8. The optical adding and dropping device as claimed in claim 6, wherein said cyclic filter includes:
a first filter adapted to transmit light from said add ports therethrough and having a cyclic transmission characteristic whose center wavelength is shifted to a longer wavelength direction or a shorter wavelength direction from a wavelength arrangement thereof in the wavelength multiplexing; and
a second filter adapted to transmit output light from said first filter and having a transmission characteristic whose center wavelength is shifted to the opposite direction to that of said first filter from the wavelength arrangement thereof in the wavelength multiplexing.

9. The optical adding and dropping device as claimed in claim 7, wherein said cyclic filter includes:
a first filter adapted to transmit light from said add ports therethrough and having a cyclic transmission characteristic whose center wavelength is shifted to a longer wavelength direction or a shorter wavelength direction from a wavelength arrangement thereof in the wavelength multiplexing; and
a second filter adapted to transmit output light from said first filter and having a transmission characteristic whose center wavelength is shifted to the opposite direction to that of said first filter from the wavelength arrangement thereof in the wavelength multiplexing.

10. The optical adding and dropping device as claimed in claim 2, wherein said spectrum foot removing section is formed from a plurality of interleavers to which light from said add ports is introduced individually, and
each of said interleavers has one input of S hertz and two outputs of 2S hertz where the channel interval is S hertz, and input light from a corresponding one of said add ports to the one input, and then outputs the received light from a first one of the two outputs thereof where the received light is that of one of the odd-numbered channels but from a second one of the two outputs thereof where the received light is that of the even-numbered channels, to said first multiplexer.

11. The optical adding and dropping device as claimed in claim 2, wherein said spectrum foot removing section includes:
   a second multiplexer adapted to multiplex light from said add ports; and
   an interleaver having one input of S hertz and two outputs of 2S hertz where the channel interval is S hertz, and adapted to input light from said second multiplexer to the one input thereof and then output the light from the odd-numbered channels from one of the two outputs thereof but outputs the light from the even-numbered channels from the other one of the outputs thereof to said first multiplexer.

12. The optical adding and dropping device as claimed in claim 2, wherein said spectrum foot removing section includes:
   an odd-numbered channel multiplexer and an even-numbered channel multiplexers adapted to multiplex light from odd-numbered channels and even-numbered channels from within light from said add ports, respectively; and
   an interleaver having two inputs of 2S hertz and one output of S hertz where the channel interval is S hertz, and adapted to input light from said odd-numbered channel multiplexer and said even-numbered channel multiplexer to the two inputs thereof and then output the light of the corresponding channels as the one input thereof to said first multiplexer.

13. The optical adding and dropping device as claimed in claim 2, wherein said spectrum foot removing section includes:
   a second multiplexer adapted to multiplex light from said add ports; and
   an interleaver having one input of S/2 hertz and two outputs of S hertz where the channel interval is S hertz, and adapted to receive light from said second multiplexer to the one input thereof and then output the light of the channels from one of the two outputs thereof to said first multiplexer.

14. The optical adding and dropping device as claimed in claim 2, wherein said spectrum foot removing section includes:
   a second multiplexer adapted to multiplex light from said add ports; and
   an interleaver having two inputs of S hertz and one output of S/2 hertz where the channel interval is S hertz, and adapted to input light from said second multiplexer to one of the two inputs thereof and then output the light of the channels from the one output thereof to said first multiplexer.

15. An optical transmission apparatus, comprising:
the optical adding and dropping device as claimed in claim 1.

16. An optical transmission apparatus, comprising:
   an optical adding and dropping device including a drop section including an input port and having a through port and a plurality of drop ports set as output ports, and a first multiplexer adapted to multiplex light from said through port and light from a plurality of add ports and output the multiplexed light to an output side transmission line; and
   an optical transmission section including a plurality of light sources corresponding to the add ports, and a spectrum foot removing section adapted to remove a self-spread of a channel light having a center frequency component, the self-spread occurring on the opposite sides of the center frequency of each channel light from said light source and output the resulting light to the first multiplexer,
   wherein the center frequency is a fundamental frequency of the channel light, and sidebands of the fundamental frequency are excluded from the self-spread.

17. An optical adding and dropping device according to claim 1, wherein the self-spread varies depending on a modulation format of the channel light.

* * * * *